United States Patent [19]
Sibiga

[11] Patent Number: 5,835,549
[45] Date of Patent: Nov. 10, 1998

[54] BWR EMERGENCY CORE COOLING SYSTEM STRAINER

[75] Inventor: David L. Sibiga, Ashford, Conn.

[73] Assignee: Combustion Engineering, Inc., Windsor, Conn.

[21] Appl. No.: 812,146

[22] Filed: Mar. 6, 1997

[51] Int. Cl.⁶ .................................................. G21C 19/307
[52] U.S. Cl. ....................... 376/313; 210/493.1; 210/483
[58] Field of Search ................................... 376/282, 313; 210/483, 493.1, 494.2, 497.01

[56] References Cited

U.S. PATENT DOCUMENTS

| | | | |
|---|---|---|---|
| 4,154,688 | 5/1979 | Pall | 210/493.1 |
| 4,693,985 | 9/1987 | Degen et al. | 210/493.1 |
| 5,453,180 | 9/1995 | Henriksson | 376/313 |
| 5,539,790 | 7/1996 | Henriksson | 376/313 |

*Primary Examiner*—Daniel D. Wasil
*Attorney, Agent, or Firm*—John H. Mulholland

[57] ABSTRACT

A BWR emergency core cooling system suction strainer. The strainer comprises corrugated metal screen material formed of alternating ridges and furrows with flat chordal lands and flat side walls interconnecting the lands; and an elongated frame with arcuate end support portions shaped to accommodate the ridges and furrows. The flat side walls merge slightly toward one another in a substantially radially inwardly direction and diverge slightly away from one another in a substantially radially outwardly direction to permit release of debris from the screen surface while providing increased screening area for a given volume of strainer.

7 Claims, 2 Drawing Sheets

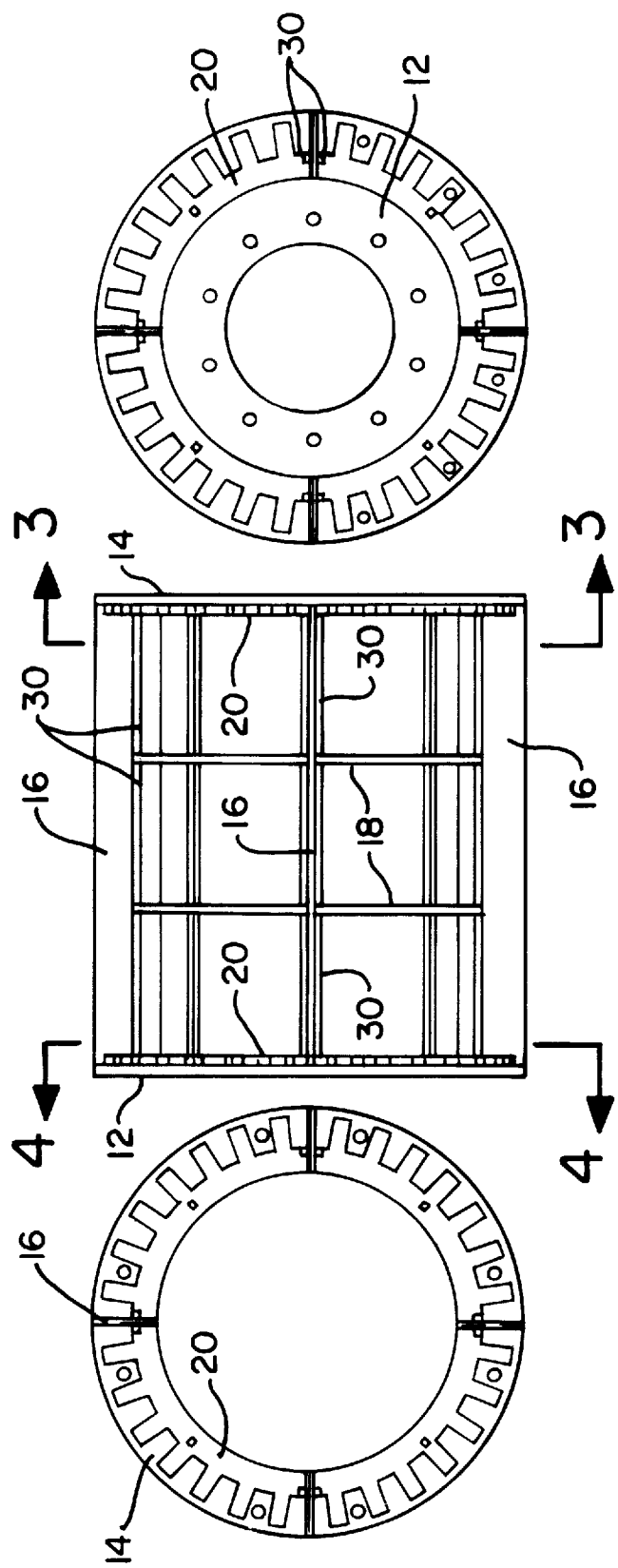

BWR EMERGENCY CORE COOLING SYSTEM STRAINER

BACKGROUND OF THE INVENTION

The invention relates to a suction strainer for a Boiling Water Reactor (BWR) Emergency Core Cooling System (ECCS).

In the event of a Loss of Coolant Accident (LOCA) in a BWR nuclear power plant, drywell insulation and debris can be transported into the suppression pool which provides a supply of water to the ECCS. This insulation, when combined with corrosion products and other debris, can migrate and block strainers installed on suction lines supplying the ECCS pumps.

On one occasion, at a BWR plant, an ECCS suction strainer became blocked with mineral wool insulation due to insulation dislodged by the discharge of a relief valve. This displaced mineral wool insulation eventually migrated into the suppression pool and clogged the strainer, causing cavitation of the spray pumps. At another BWR plant, during a scheduled outing, it was observed that an ECCS residual heat removal suction strainer had become clogged. Accordingly, alternate ECCS suction strainer designs to mitigate the ECCS strainer clogging problem of BWR nuclear plants have been considered. See, for example, U.S. Pat. No. 5,426,679; U.S. Pat. No. 5,453,180 and U.S. Pat. No. 5,539,790.

SUMMARY OF THE INVENTION

The instant invention is an improved BWR nuclear plant ECCS suction strainer which, after full scale testing, has proven to provide significantly lower head loss at a given debris loading and to provide easy release of debris from the screen surface while providing increased screening area for a given volume of strainer.

The suction strainer comprises a generally cylindrical structure which is made up of an elongated frame, or axially bolted together frames, having mounted thereon a corrugated metal screen material with a regular pattern of holes formed into a shape including alternating ridges and furrows. The elongated frame includes substantially arcuate screen material end support portions mounted on end flanges and shaped like portions of cog wheels to accommodate the ridges and furrows of the corrugated screen material. The end flanges may be made of the screening material to increase the screening area. The alternating ridges and furrows are defined by flat chordal lands and flat side walls interconnecting the lands of the ridges and furrows.

The flat side walls merge slightly toward one another in a substantially radially inward direction and diverge slightly away from one another in a substantially radially outward direction to permit easy release of debris from the screen surface while providing increased screening area for a given volume of strainer. The arcuate frame portions at each end of the frame and transverse arcuate intermediate supports are interconnected with longitudinal members and ribs.

BRIEF DESCRIPTION OF THE DRAWINGS

FIG. 2 is a side elevational view of the suction strainer of FIG. 1;

FIG. 3 is a view taken along line 3—3 of FIG. 2;

FIG. 4 is a view taken along line 4—4 of FIG. 2.

DETAILED DESCRIPTION OF THE PREFERRED EMBODIMENT

Figure 1:
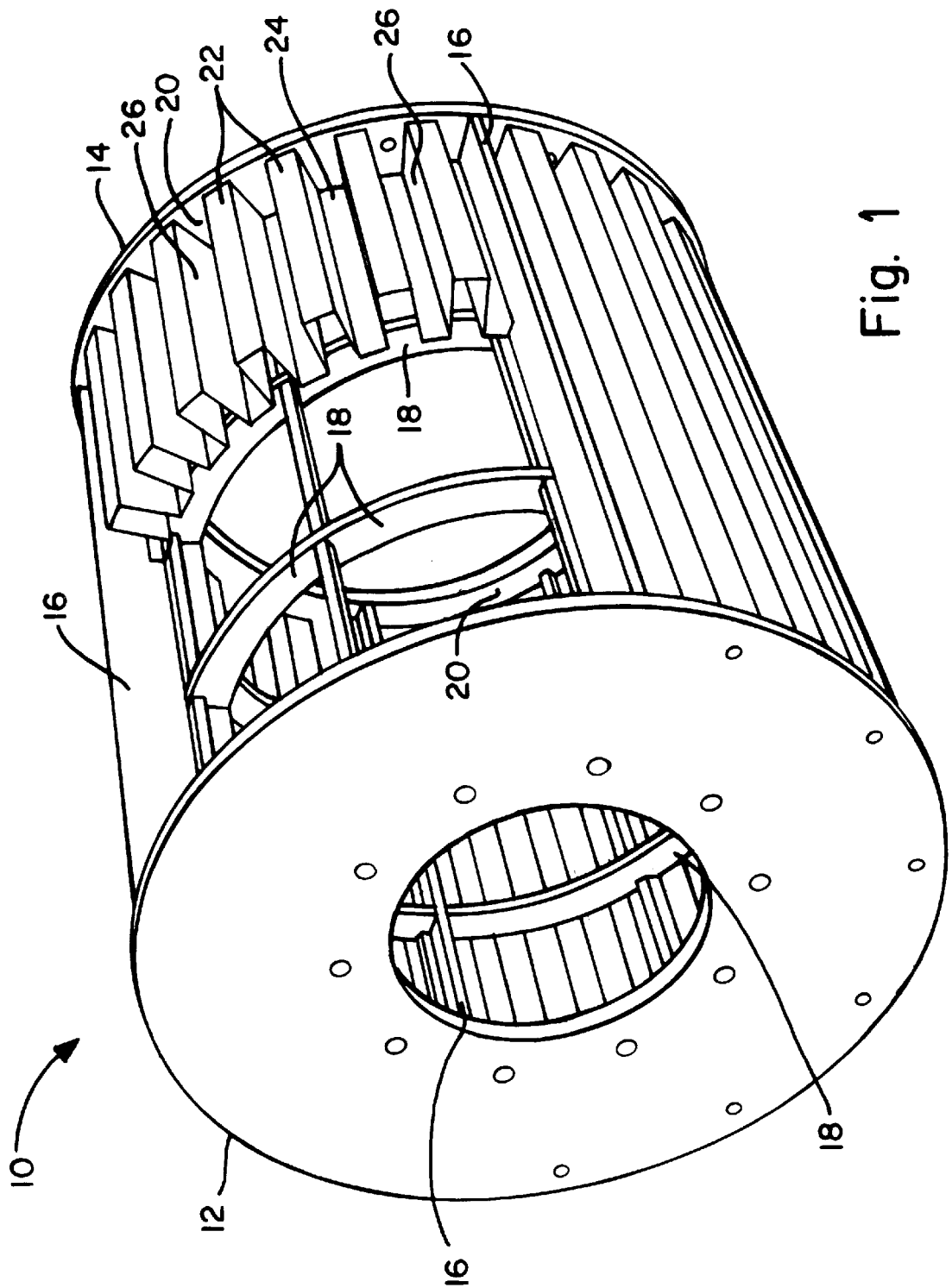
FIG. 1 is a partial perspective view of the suction strainer of the invention with portions broken away for clarity.

The numeral 10 generally designates a stainless steel suction strainer for a BWR Emergency Core Cooling system.

The suction strainer 10 has a frame made up of annular end flanges 12 and 14 attached, as by welding, at opposite respective ends of longitudinal members 16. The longitudinal members 16 are, typically, four in number and placed at ninety degrees (90°) from each other around the end flanges 12 and 14. The flanges 12 and 14 may or may not be made of the screening material which is, typically stainless steel sheet with a regular pattern of holes, typically within the range of $1/16$ to $1/8$ inch in diameter. For most effective screening, flanges 12 and 14 are made of screening material.

Transverse arcuate intermediate supports 18 span the (90°) arcs between longitudinal members and are welded to the sides of the longitudinal members 16 at the points of intersection therewith. There are two such sets of intermediate supports 18 in the illustrated suction strainer 10. It will be understood, however, that the suction strainers 10 normally are replacement strainers in BWR's and the size and flange connections are designed for each plant.

Bolted on the inside of the flanges 12 and 14 are arcuate end support portions 20 which are shaped as portions of cog wheels. The end support portions 20 are shaped to accommodate ridges 22 and furrows 24 of the corrugated screen material.

The ridges 22 and furrows 24 each have flat chordal lands which are interconnected by side walls 26. The opposing side walls 26 on either side of a chordal land of a furrow 24 merge slightly toward one another in a substantially radially inwardly direction and diverge slightly away from one another in a substantially radially outwardly direction to permit easy release of debris from the screen surface while providing increased screening area for a given volume of strainer.

This shape is important because it has been shown in tests that if the side walls were to converge to substantially a V-shape, without a flat chordal land at the bottom of furrows 24, debris will stick in the furrow and clog the strainer. On the other hand, without the side walls 26, there would be much less screening area for a given volume of strainer since it will be seen that with screen material having a regular pattern of holes provided therein, the lands of ridges 22, the lands of furrows 24 and the side walls 26 all contribute effective screening area.

Porosity of the screen material used is typically in the range of 25 to 40 percent with the 40 percent being preferred, depending on the specific debris encountered.

The frame of the suction strainer 10 can be stiffened by square ribs 30 being welded between the arcuate intermediate supports and along the longitudinal members 16.

By the illustrated and above described means, an effective extended surface replacement suction strainer for BWR Emergency Core Cooling Systems is provided.

I claim:

1. A suction strainer for a boiling water reactor emergency core cooling system comprising:

an elongated frame which includes substantially arcuate screen material end support portions shaped to accommodate ridges and furrows of corrugated screen material;

corrugated metal screen material formed of alternating ridges and furrows with flat chordal lands and flat side walls interconnecting the lands of the ridges and furrows;

said flat side walls merging slightly toward one another in a substantially radially inwardly direction and diverging slightly away from one another in a substantially radially outwardly direction to permit easy release of debris from the screen surface while providing increased screening area for a given volume of strainer.

2. The suction strainer of claim 1 in which the frame supports screen material on at least one end thereof.

3. The suction strainer of claim 2 in which the frame arcuate end support portions are shaped as portions of cog wheels.

4. The suction strainer of claim 1 in which the frame includes longitudinal members connecting the arcuate portions at each end of the elongated frame.

5. The suction strainer of claim 4 in which the longitudinal members are interconnected by transverse arcuate intermediate supports.

6. The suction strainer of claim 1 in which two or more strainers are bolted end to end.

7. The suction strainer of claim 1 in which the screen material is sheet metal with a regular pattern of holes provided therein.

* * * * *